(12) United States Patent
Castonguay et al.

(10) Patent No.: US 7,822,310 B2
(45) Date of Patent: Oct. 26, 2010

(54) FIBER OPTIC SPLICE TRAYS

(75) Inventors: Guy Castonguay, Shanghai (CN); Donnie Ray Clapp, Jr., Fort Worth, TX (US); Brent Michael Frazier, Haslet, TX (US); Karyne Poissant Prevratil, Watauga, TX (US); Diana Rodriguez, Fort Worth, TX (US); Steven Ross Sims, Denton, TX (US); Antwan Joco'ques Works, Lewisville, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/712,168

(22) Filed: Feb. 28, 2007

(65) Prior Publication Data

US 2008/0205844 A1 Aug. 28, 2008

(51) Int. Cl.
 *G02B 6/00* (2006.01)
(52) U.S. Cl. .......................... 385/135; 174/91
(58) Field of Classification Search ............. 385/52–53, 385/92; 206/557
See application file for complete search history.

(56) References Cited

U.S. PATENT DOCUMENTS

| | | | |
|---|---|---|---|
| 4,736,100 A | 4/1988 | Vastagh | 250/227 |
| 4,747,020 A | 5/1988 | Brickley et al. | 361/428 |
| 4,824,193 A | 4/1989 | Maeda et al. | 350/3.72 |
| 4,900,123 A | 2/1990 | Barlow et al. | 350/96.2 |
| 4,948,220 A | 8/1990 | Violo et al. | 350/96.2 |
| 4,995,688 A | 2/1991 | Anton et al. | 350/96.1 |
| 5,023,646 A | 6/1991 | Ishida et al. | 354/402 |
| 5,048,916 A * | 9/1991 | Caron | 385/71 |
| 5,066,149 A | 11/1991 | Wheeler et al. | 385/135 |
| 5,071,211 A | 12/1991 | Debortoli et al. | 385/76 |
| 5,071,220 A | 12/1991 | Ruello et al. | 385/135 |
| 5,073,042 A | 12/1991 | Mulholland et al. | 385/69 |

(Continued)

FOREIGN PATENT DOCUMENTS

EP 1203974 5/2002

(Continued)

OTHER PUBLICATIONS

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

(Continued)

*Primary Examiner*—Charlie Peng
*Assistant Examiner*—Peter Radkowski
(74) *Attorney, Agent, or Firm*—John H. Vynalek

(57) ABSTRACT

There is provided splice trays and splice assemblies that provide convenient access to optical fiber slack within a relatively small area or volume. Some splice trays are adapted for use with microstructured optical fibers to further reduce the size of the splice tray or splice assembly. Some splice trays provide fiber routing devices on the cover of the splice tray. The fiber routing device may be positioned on an inside surface of the cover and/or on an outside surface of the cover. The splice trays and/or splice assemblies may be used with or as fiber drop terminals used within multiple dwelling units.

24 Claims, 9 Drawing Sheets

U.S. PATENT DOCUMENTS

| | | | |
|---|---|---|---|
| 5,074,635 A | 12/1991 | Justice et al. | 385/95 |
| 5,076,688 A | 12/1991 | Bowen et al. | 356/73.1 |
| 5,142,598 A | 8/1992 | Tabone | 385/78 |
| D330,368 S | 10/1992 | Bourgeois et al. | D13/154 |
| 5,204,929 A | 4/1993 | Machall et al. | 385/135 |
| 5,214,735 A | 5/1993 | Henneberger et al. | 385/136 |
| 5,233,674 A | 8/1993 | Vladic | 385/56 |
| 5,243,679 A | 9/1993 | Sharrow et al. | 385/135 |
| 5,260,957 A | 11/1993 | Hakimi et al. | 372/39 |
| 5,274,731 A | 12/1993 | White | 385/135 |
| 5,317,663 A | 5/1994 | Beard et al. | 385/70 |
| 5,323,480 A | 6/1994 | Mullaney et al. | 385/135 |
| 5,333,221 A | 7/1994 | Briggs et al. | 385/55 |
| 5,333,222 A | 7/1994 | Belenkiy et al. | 385/70 |
| 5,359,688 A | 10/1994 | Underwood | 385/70 |
| 5,367,598 A | 11/1994 | Devenish, III et al. | 385/135 |
| 5,383,051 A | 1/1995 | Delrosso et al. | 359/341 |
| 5,402,515 A | 3/1995 | Vidacovich et al. | 385/135 |
| 5,408,557 A | 4/1995 | Hsu | 385/72 |
| RE34,955 E | 5/1995 | Anton et al. | 385/53 |
| 5,420,956 A | 5/1995 | Grugel et al. | 385/135 |
| 5,420,958 A | 5/1995 | Henson et al. | 385/135 |
| 5,438,641 A | 8/1995 | Malacarne | 385/137 |
| 5,442,726 A | 8/1995 | Howard et al. | 385/135 |
| 5,448,015 A | 9/1995 | Jamet et al. | 174/68.3 |
| 5,473,115 A * | 12/1995 | Brownlie et al. | 174/50 |
| 5,479,553 A * | 12/1995 | Daems et al. | 385/135 |
| 5,490,229 A | 2/1996 | Ghandeharizadeh et al. | 385/135 |
| 5,497,444 A | 3/1996 | Wheeler | 385/135 |
| 5,542,015 A | 7/1996 | Hultermans | 385/60 |
| 5,553,183 A | 9/1996 | Bechamps | 385/95 |
| 5,553,186 A | 9/1996 | Allen | 385/135 |
| 5,570,895 A * | 11/1996 | McCue et al. | 280/47.19 |
| 5,590,234 A | 12/1996 | Pulido | 385/135 |
| 5,602,954 A | 2/1997 | Nolf et al. | 385/135 |
| 5,613,030 A | 3/1997 | Hoffer et al. | 385/135 |
| 5,617,501 A | 4/1997 | Miller et al. | 385/134 |
| 5,647,043 A | 7/1997 | Anderson et al. | 385/78 |
| 5,689,605 A | 11/1997 | Cobb et al. | 385/135 |
| 5,692,299 A * | 12/1997 | Daems et al. | 29/869 |
| 5,694,511 A | 12/1997 | Pimpinella et al. | 385/134 |
| 5,708,751 A * | 1/1998 | Mattei | 385/135 |
| 5,734,776 A | 3/1998 | Puetz | 385/134 |
| 5,751,882 A | 5/1998 | Daems et al. | 385/135 |
| 5,758,004 A | 5/1998 | Alarcon et al. | 385/135 |
| 5,764,843 A * | 6/1998 | Macken et al. | 385/135 |
| 5,774,612 A | 6/1998 | Belenkiy et al. | 385/72 |
| 5,793,920 A | 8/1998 | Wilkins et al. | 385/135 |
| 5,793,921 A | 8/1998 | Wilkins et al. | 385/135 |
| 5,796,908 A | 8/1998 | Vicory | 385/135 |
| 5,823,646 A | 10/1998 | Arizpe et al. | 312/324 |
| 5,825,955 A | 10/1998 | Ernst et al. | 385/79 |
| 5,825,961 A | 10/1998 | Willkins et al. | 385/135 |
| 5,832,162 A | 11/1998 | Sarbell | 385/99 |
| 5,835,657 A | 11/1998 | Suarez et al. | 385/135 |
| 5,835,658 A | 11/1998 | Smith | 385/136 |
| 5,862,290 A | 1/1999 | Burek et al. | 385/135 |
| 5,870,519 A | 2/1999 | Jenkins et al. | 385/135 |
| 5,881,200 A | 3/1999 | Burt | 385/142 |
| 5,883,995 A | 3/1999 | Lu | 385/60 |
| 5,884,003 A | 3/1999 | Cloud et al. | 385/135 |
| 5,892,877 A | 4/1999 | Meyerhoefer | 385/136 |
| 5,930,425 A | 7/1999 | Abel et al. | 385/53 |
| 5,945,633 A | 8/1999 | Ott et al. | 174/59 |
| 5,956,444 A | 9/1999 | Duda et al. | 385/53 |
| 5,969,294 A | 10/1999 | Eberie et al. | 174/57 |
| 5,975,769 A | 11/1999 | Larson et al. | 385/53 |
| 6,009,225 A * | 12/1999 | Ray et al. | 385/135 |
| 6,009,255 A | 12/1999 | Shinzawa | 395/500.27 |
| 6,027,252 A | 2/2000 | Erdman et al. | 385/76 |
| 6,044,193 A | 3/2000 | Szentesi et al. | 385/134 |
| 6,061,492 A | 5/2000 | Strause et al. | 385/135 |
| 6,079,881 A | 6/2000 | Roth | 385/76 |
| 6,149,315 A | 11/2000 | Stephenson | 385/60 |
| 6,151,436 A * | 11/2000 | Burek et al. | 385/135 |
| 6,160,946 A | 12/2000 | Thompson et al. | 385/134 |
| 6,188,687 B1 | 2/2001 | Mussman et al. | 370/388 |
| 6,188,825 B1 | 2/2001 | Bandy et al. | 385/134 |
| 6,192,180 B1 | 2/2001 | Kim et al. | 385/135 |
| 6,208,796 B1 | 3/2001 | Williams Vigliaturo | 385/135 |
| 6,215,938 B1 | 4/2001 | Reitmeier et al. | 385/135 |
| 6,227,717 B1 | 5/2001 | Ott et al. | 385/53 |
| 6,234,683 B1 | 5/2001 | Waldron et al. | 385/78 |
| 6,236,795 B1 | 5/2001 | Rodgers | 385/134 |
| 6,240,229 B1 | 5/2001 | Roth | 385/53 |
| 6,263,141 B1 | 7/2001 | Smith | 385/135 |
| 6,269,212 B1 | 7/2001 | Schiatrone | 385/135 |
| 6,275,640 B1 * | 8/2001 | Hunsinger et al. | 385/135 |
| 6,275,641 B1 | 8/2001 | Daoud | 385/135 |
| 6,278,829 B1 | 8/2001 | BuAbbud et al. | 385/135 |
| 6,292,614 B1 | 9/2001 | Smith et al. | 385/135 |
| 6,307,997 B1 | 10/2001 | Walters et al. | 385/134 |
| RE37,489 E | 1/2002 | Anton et al. | 385/53 |
| 6,347,888 B1 | 2/2002 | Puetz | 385/53 |
| 6,353,697 B1 | 3/2002 | Daoud | 385/136 |
| 6,359,228 B1 * | 3/2002 | Strause et al. | 174/91 |
| 6,363,200 B1 | 3/2002 | Thompson et al. | 385/135 |
| 6,379,166 B1 | 4/2002 | Hagarty et al. | 439/135 |
| 6,411,767 B1 | 6/2002 | Burrous et al. | 385/135 |
| 6,418,262 B1 | 7/2002 | Puetz et al. | 385/134 |
| 6,424,781 B1 | 7/2002 | Puetz et al. | 385/135 |
| 6,424,782 B1 | 7/2002 | Ray | 385/135 |
| 6,425,694 B1 | 7/2002 | Szilagyi et al. | 385/76 |
| 6,431,762 B1 | 8/2002 | Taira et al. | 385/56 |
| 6,434,313 B1 * | 8/2002 | Clapp et al. | 385/135 |
| 6,438,310 B1 | 8/2002 | Lance et al. | 385/135 |
| 6,452,925 B1 | 9/2002 | Sistanizadeh et al. | 370/352 |
| 6,464,402 B1 | 10/2002 | Andrews et al. | 385/53 |
| D466,087 S | 11/2002 | Cuny et al. | D13/152 |
| 6,480,487 B1 | 11/2002 | Wegleitner et al. | 370/354 |
| 6,480,660 B1 | 11/2002 | Reitmeier et al. | 385/135 |
| 6,483,977 B2 | 11/2002 | Battey et al. | 385/135 |
| 6,496,640 B1 | 12/2002 | Harvey et al. | 385/135 |
| 6,507,691 B1 * | 1/2003 | Hunsinger et al. | 385/135 |
| 6,539,147 B1 | 3/2003 | Mahony | 385/24 |
| 6,539,155 B1 * | 3/2003 | Broeng et al. | 385/125 |
| 6,539,160 B2 | 3/2003 | Battey et al. | 385/135 |
| 6,542,688 B1 | 4/2003 | Battey et al. | 385/135 |
| 6,554,485 B1 | 4/2003 | Beatty et al. | 385/72 |
| 6,567,601 B2 | 5/2003 | Daoud et al. | 385/135 |
| 6,577,595 B1 | 6/2003 | Counterman | 370/230 |
| 6,577,801 B2 | 6/2003 | Broderick et al. | 385/125 |
| 6,597,670 B1 | 7/2003 | Tweedy et al. | 370/328 |
| 6,612,515 B1 | 9/2003 | Tinucci et al. | 242/388.1 |
| 6,614,974 B2 * | 9/2003 | Elrefaie et al. | 385/125 |
| 6,614,980 B1 | 9/2003 | Mahony | 385/135 |
| 6,621,975 B2 | 9/2003 | Laporte et al. | 385/135 |
| 6,625,374 B2 | 9/2003 | Holman et al. | 385/135 |
| 6,625,375 B1 | 9/2003 | Mahony | 385/135 |
| 6,631,237 B2 | 10/2003 | Knudsen | 385/134 |
| 6,640,028 B1 * | 10/2003 | Schroll et al. | 385/32 |
| 6,652,163 B2 * | 11/2003 | Fajardo et al. | 385/96 |
| 6,654,536 B2 | 11/2003 | Battey et al. | 385/134 |
| 6,668,127 B1 | 12/2003 | Mahony | 385/135 |
| 6,710,366 B1 | 3/2004 | Lee et al. | 257/14 |
| 6,778,752 B2 | 8/2004 | Laporte et al. | 385/135 |
| 6,819,856 B2 | 11/2004 | Dagley et al. | 385/134 |
| 6,819,857 B2 | 11/2004 | Douglas et al. | 385/135 |
| 6,845,207 B2 | 1/2005 | Schray | 385/135 |
| 6,850,685 B2 | 2/2005 | Tinucci et al. | 385/134 |
| 6,865,334 B2 | 3/2005 | Cooke et al. | 385/139 |
| 6,870,734 B2 | 3/2005 | Mertesdorf et al. | 381/684 |
| 6,870,997 B2 | 3/2005 | Cooke et al. | 385/135 |
| 6,879,545 B2 | 4/2005 | Cooke et al. | 367/149 |

| | | | |
|---|---|---|---|
| 6,920,273 B2 | 7/2005 | Knudsen | 385/135 |
| 6,920,274 B2 | 7/2005 | Rapp et al. | 385/135 |
| 6,925,241 B2 | 8/2005 | Bohle et al. | 381/135 |
| 6,934,451 B2 | 8/2005 | Cooke et al. | 385/100 |
| 6,968,107 B2 | 11/2005 | Belardi et al. | 385/127 |
| 6,993,228 B2 * | 1/2006 | Burke et al. | 385/123 |
| 7,006,748 B2 | 2/2006 | Dagley et al. | 385/134 |
| 7,027,695 B2 | 4/2006 | Cooke et al. | 385/105 |
| 7,054,513 B2 | 5/2006 | Herz et al. | 385/12 |
| 7,068,907 B2 | 6/2006 | Schray | 385/135 |
| 7,103,255 B2 | 9/2006 | Reagan et al. | 385/135 |
| 7,110,654 B2 | 9/2006 | Dillat | 385/135 |
| 7,120,347 B2 | 10/2006 | Blackwell, Jr. et al. | 385/135 |
| 7,200,316 B2 | 4/2007 | Giraud et al. | 385/135 |
| 7,215,865 B2 | 5/2007 | Bellekens et al. | 385/135 |
| 7,272,291 B2 | 9/2007 | Bayazit et al. | 385/135 |
| 7,274,852 B1 | 9/2007 | Smrha et al. | 385/135 |
| 7,302,153 B2 | 11/2007 | Thom | 385/135 |
| 7,421,182 B2 | 9/2008 | Bayazit et al. | 385/135 |
| 7,460,757 B2 | 12/2008 | Hoehne et al. | 385/135 |
| 7,477,826 B2 | 1/2009 | Mullaney et al. | 385/134 |
| 2002/0034290 A1 | 3/2002 | Pershan | 379/207.02 |
| 2002/0037136 A1* | 3/2002 | Wang et al. | 385/39 |
| 2003/0063875 A1* | 4/2003 | Bickham et al. | 385/98 |
| 2003/0103750 A1* | 6/2003 | Laporte et al. | 385/134 |
| 2003/0174996 A1 | 9/2003 | Henschel et al. | 385/135 |
| 2004/0074852 A1 | 4/2004 | Knudsen et al. | 211/26 |
| 2004/0175090 A1 | 9/2004 | Vastmans et al. | 385/135 |
| 2004/0218970 A1* | 11/2004 | Caveney et al. | 403/322.1 |
| 2004/0228598 A1 | 11/2004 | Allen et al. | 385/135 |
| 2004/0264873 A1 | 12/2004 | Smith et al. | 385/53 |
| 2005/0002633 A1 | 1/2005 | Solheid et al. | 385/135 |
| 2005/0123261 A1 | 6/2005 | Bellekens et al. | 385/135 |
| 2005/0129379 A1 | 6/2005 | Reagan et al. | 385/135 |
| 2006/0093303 A1 | 5/2006 | Reagan et al. | 385/135 |
| 2006/0153517 A1 | 7/2006 | Reagan et al. | 385/135 |
| 2006/0215980 A1 | 9/2006 | Bayazit et al. | 385/135 |
| 2006/0275008 A1* | 12/2006 | Xin | 385/135 |
| 2007/0003204 A1 | 1/2007 | Makrides-Saravanos et al. | 385/135 |
| 2007/0031099 A1 | 2/2007 | Herzog et al. | 385/135 |
| 2007/0047894 A1 | 3/2007 | Holmberg et al. | 385/135 |
| 2007/0104447 A1 | 5/2007 | Allen | 385/135 |

FOREIGN PATENT DOCUMENTS

| | | |
|---|---|---|
| EP | 1316829 | 6/2003 |
| JP | 2007-47336 | 2/2007 |
| WO | WO2007/050515 | 5/2007 |

OTHER PUBLICATIONS

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp. 271-282; 2001.

www.everythingfiberoptic.com, Splice Trays, Copyright © At Last Electronics Corp. 2006.

www.siemon.com/us/oem/splice_tray.asp, © 1995-2006 Siemon, www.siemon.com, The Siemon Company, Siemon Business Park, 1010 Siemon Drive, Watertown, CT 06795-0400 USA.

www.adckrone.com, Products and Services, Splice Trays, Copyright © 2006, ADC.

Corning Cable Systems, Splice Trays, A LANscape® Solutions Product, Product Specifications (5 pages), Corning Cable Systems LLC, P.O. Box 489, Hickory, NC 28603-0489 USA, May 2005.

Hitachi Cable Review No. 24, "Low-loss Holey Fiber", Aug. 2005, 5 pages.

Draka, Draka Comteq | Optical Fibre, "BendBright$^{xs}$ Single Mode Optical Fibre, Enhanced low macrobending sensitive, low water peak fibre, Product Type: G.652D, Coating Type: ColorLock™ and Natural", Issue Date: Aug. 2006, Supersedes. -/-, www.drakafibre.com | www.draka.com, 2 pages.

Patent Cooperation Treaty, International Search Report for International Application No. PCT/US2008/002514, Aug. 8. 2008, 1 page.

* cited by examiner

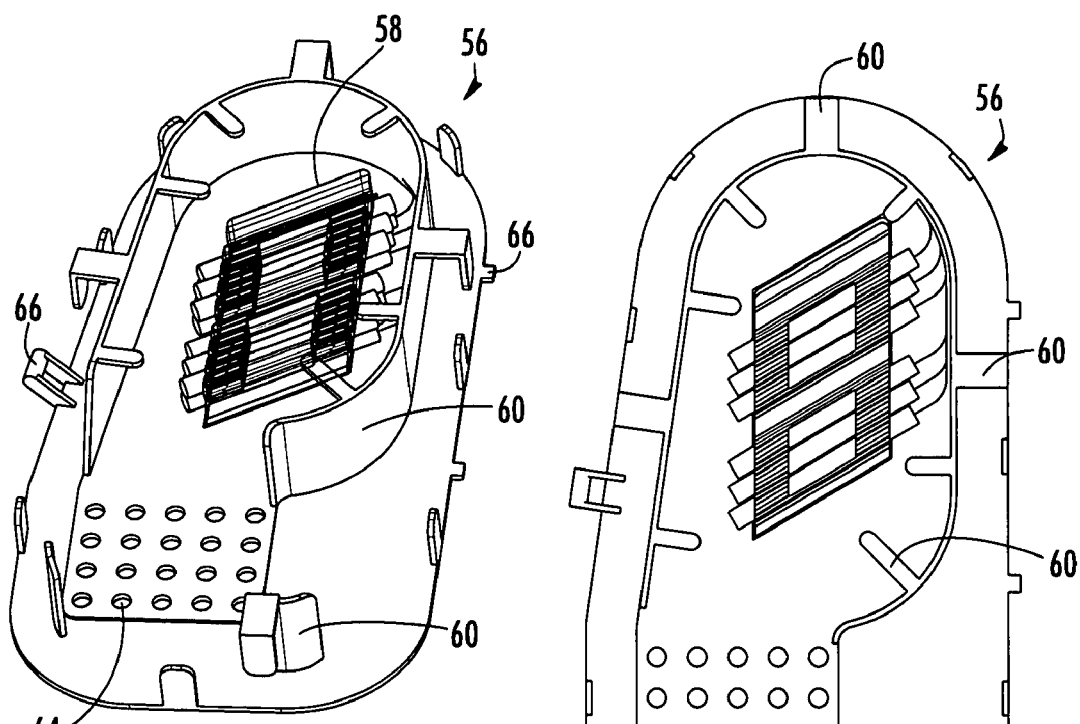
FIG. 11
FIG. 12
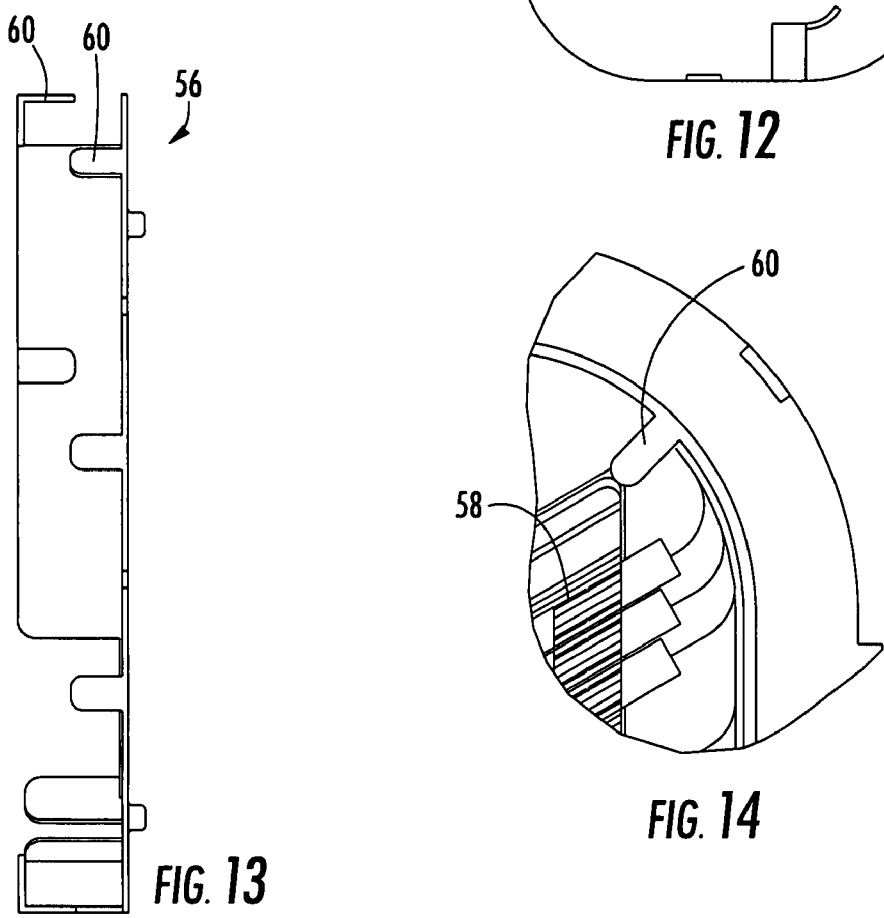
FIG. 13
FIG. 14

FIBER OPTIC SPLICE TRAYS

BACKGROUND OF THE INVENTION

1. Field of the Invention

The present invention is related to fiber optic splice trays, and more particularly, to fiber optic splice trays that provide novel sizes, shapes, and/or functionality.

2. Description of Related Art

Fiber optic data and communication systems employ splice trays and splice assemblies at various points along a distribution network. For example, a splice assembly may be used to connect drop cables to an express cable. The drop cables may lead to individual businesses or dwellings. The splice assembly often has a frame with an end cap on one or both ends to define a splice closure. The frame has provisions for receiving splice trays and storing slack fiber optic cable. The express cable typically has a jacket surrounding a number of buffer or express tubes. Each express tube typically has a plurality of optical fibers, usually from six to about twelve. The jacket of the cable will be stripped off and sealed around an aperture in the end cap of the splice closure. Some of the tubes will be cut and extend between the end cap and splice trays attached to the frame. Other express tubes may remain uncut and will pass in a loop around the frame and back out the end cap.

The splice trays typically have splice organizers comprising one or more splice holders for retaining splices that connect individual optical fibers, such as fibers from the express tubes, to drop cable fibers. A prior art splice tray may comprise a splice organizer of multiple splice holders adapted to selectively receive a splice that optically connects a first optical fiber and a second optical fiber. The splice may be formed by any conventional splice technique, such as mechanical splicing or fusion splicing. In order to splice and perform other related manipulation of the optical fibers, optical fiber slack is typically readily available, for example, to allow the fibers to be properly positioned for splicing and/or to position the splice in the splice holder without bending any portion of the optical fiber beyond the minimum bend radius of the optical fiber (which may result in performance degradation and/or failure of the optical fiber). Conventional splice trays typically provide slack storage within the perimeter of the splice tray in which the optical fibers are wound a number of times against the inner surface of the side wall and/or possibly against a retainer device, such as the overhanging lip that projects inwardly from the side walls of the splice tray. Such splice trays define a certain amount of area and volume to provide the desired slack storage with the required bend radius for the optical fibers.

Therefore, a need exists for splice trays and/or splice assemblies that define a generally smaller area and volume for at least the reasons of reduced material costs, easier hardware handling, and/or improved aesthetics. In addition, there exists a need for splice trays that afford convenient access to a sufficient amount of fiber slack while enabling the splice tray to be installed in a variety of locations and/or orientations.

BRIEF SUMMARY OF THE INVENTION

The various embodiments of the present invention address the above needs and achieve other advantages by providing splice trays that define generally smaller areas and/or volumes in addition to improved functionality, such as improved slack storage.

One embodiment of the present invention provides a splice tray for accommodating at least one splice of two or more optical fibers. The splice tray comprises a base and a cover attached to the base to selectively define an opened position and a closed position. The splice tray also includes a plurality of splice holders that selectively receive splices. The splice tray further includes at least one optical fiber routing device provided on the cover of the splice tray, such that the optical fiber routing device is adapted to provide slack storage optical fibers when the cover defines an opened position and when the cover defines a closed position.

Another embodiment of the present invention includes a splice assembly adapted for use as a fiber drop terminal ("FDT") within a multiple dwelling unit to optically connect one or more optical fibers of a distribution cable to one or more optical fibers of drop cables. The splice assembly comprises a base and a cover rotatably attached to the base. A splice tray is also included within the splice assembly and is attached to the base. A optical fiber routing device is provided with the splice tray and a cable routing device is provided on the base. The splice assembly is further adapted to be used with microstructured optical fibers that comprise a core region and a cladding region surrounding the core region, the cladding region comprising an annular hole-containing region comprised of non-periodically disposed holes. Therefore, the splice assembly provides convenient splicing and slack storage in a relatively small area and/or volume.

Additional embodiments of the present invention provide additional features to improve the size and/or functionality of the splice trays and/or splice assemblies.

BRIEF DESCRIPTION OF THE SEVERAL VIEWS OF THE DRAWINGS

Figure 1:
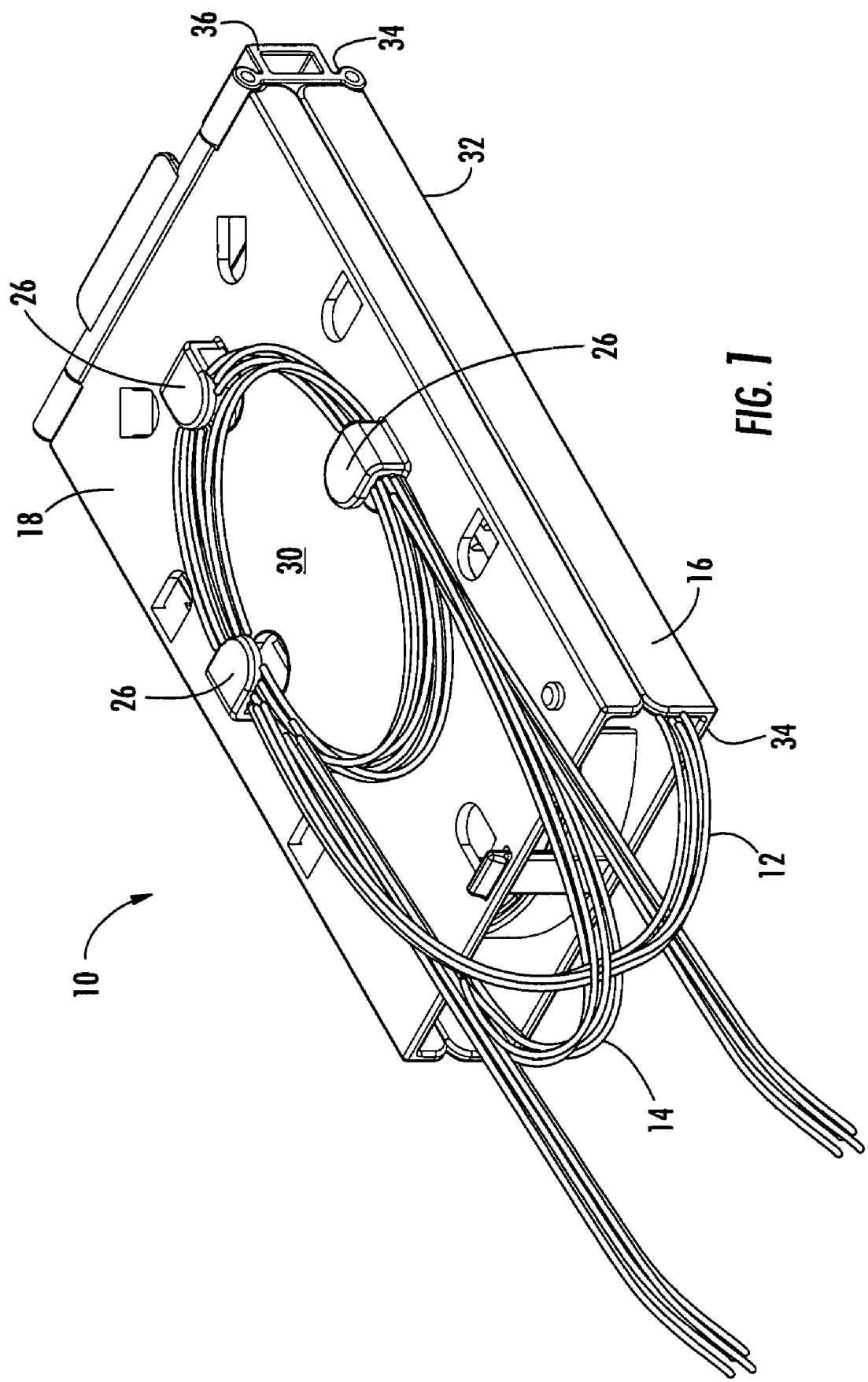
Figure 2:
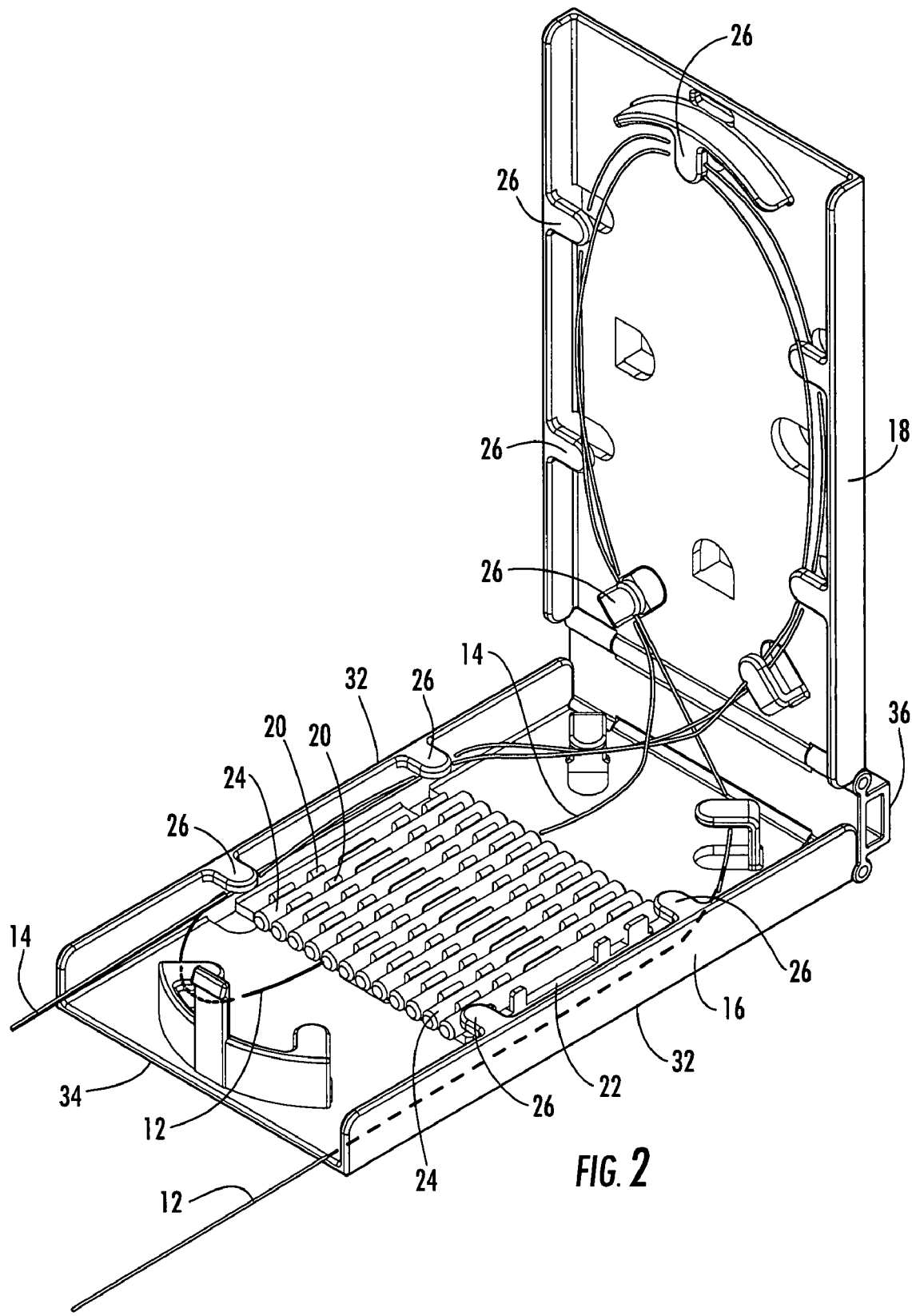
Figure 3:
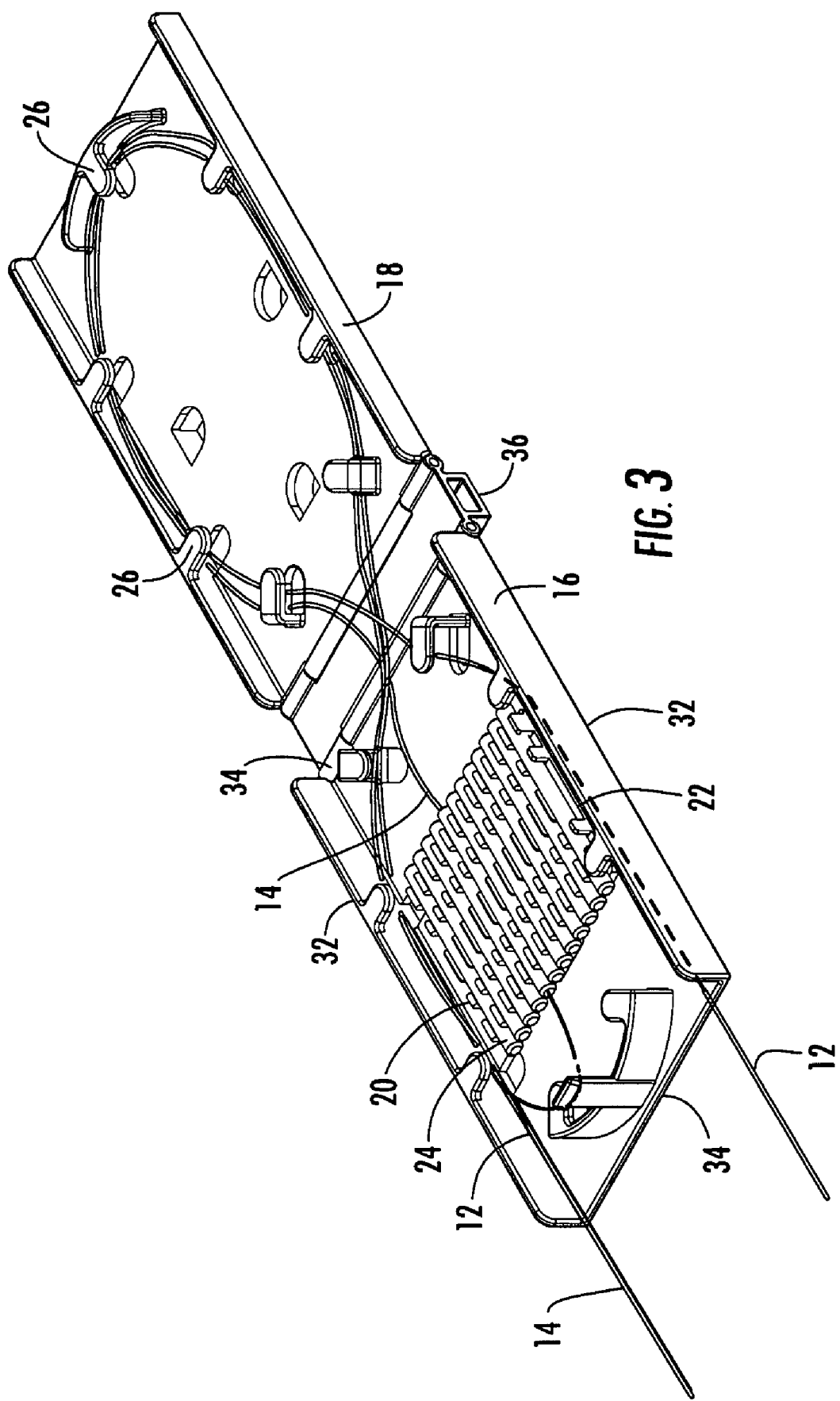
Figure 4:
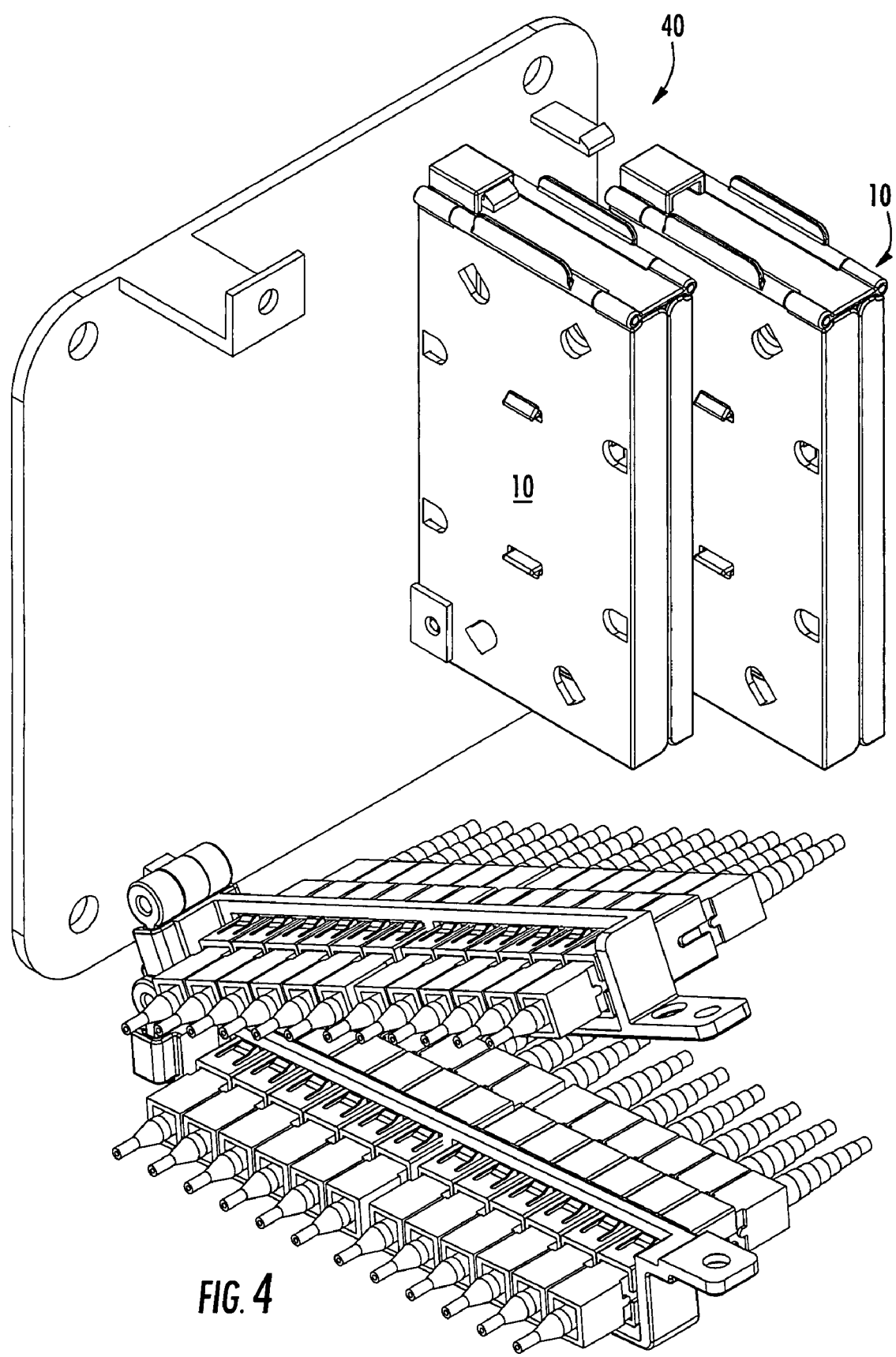
Figure 6:
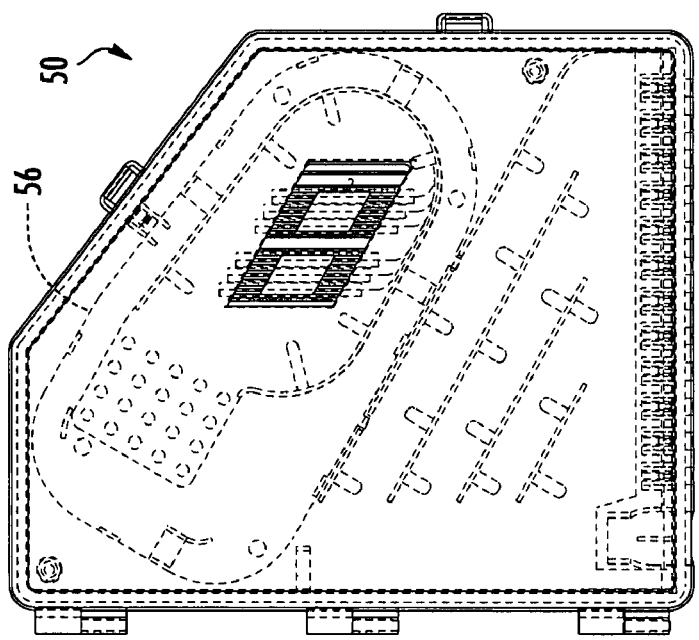
Figure 5:
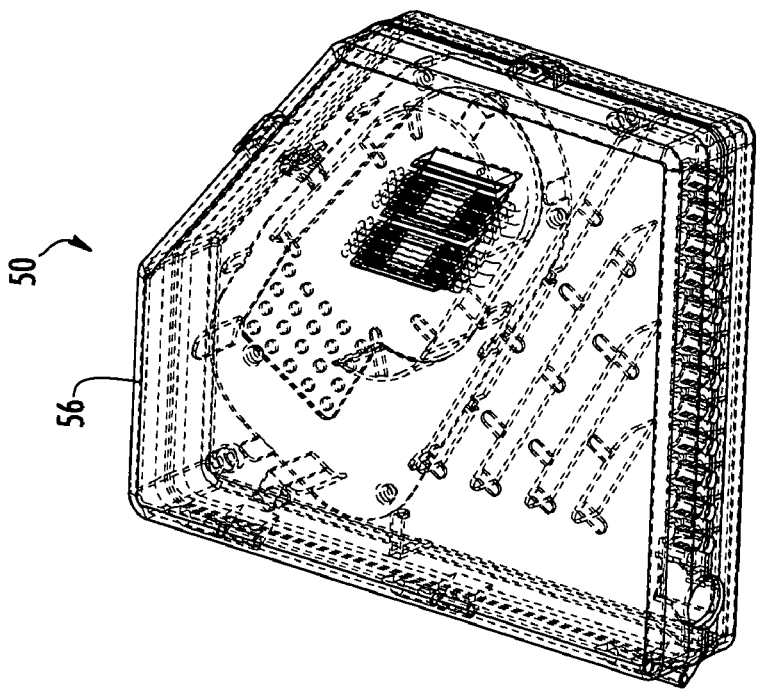
Figure 7:
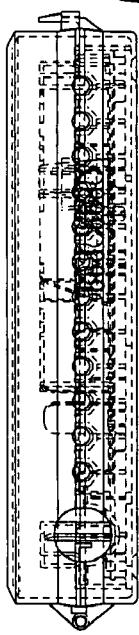
Figure 9:
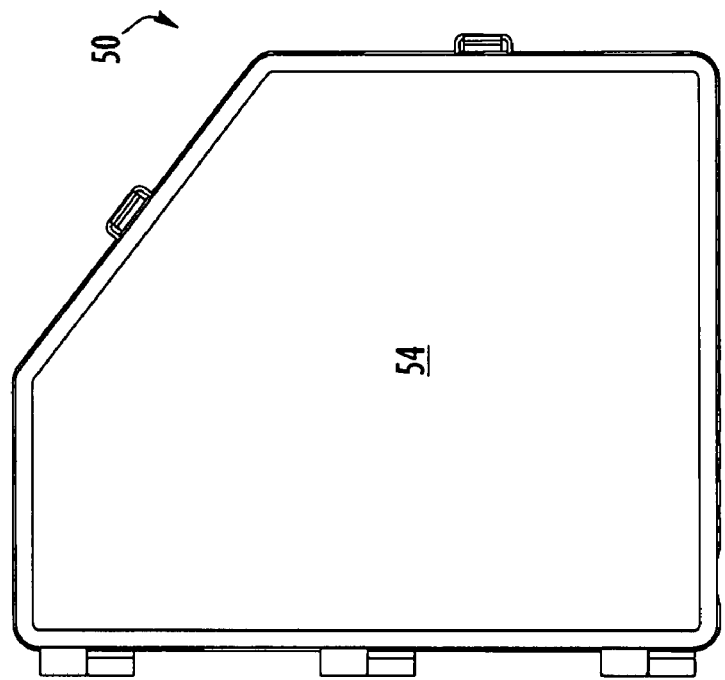
Figure 8:
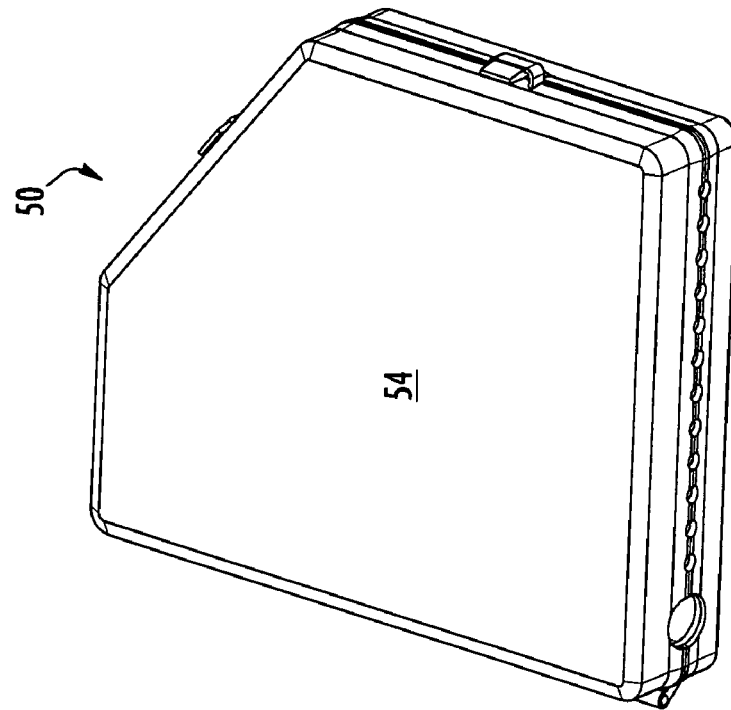
Figure 10:
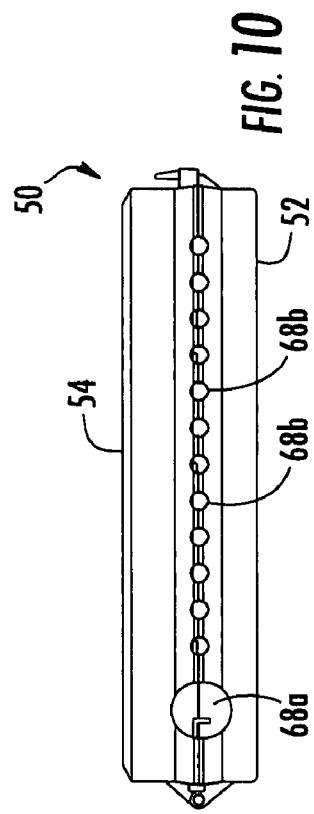
Figure 15:
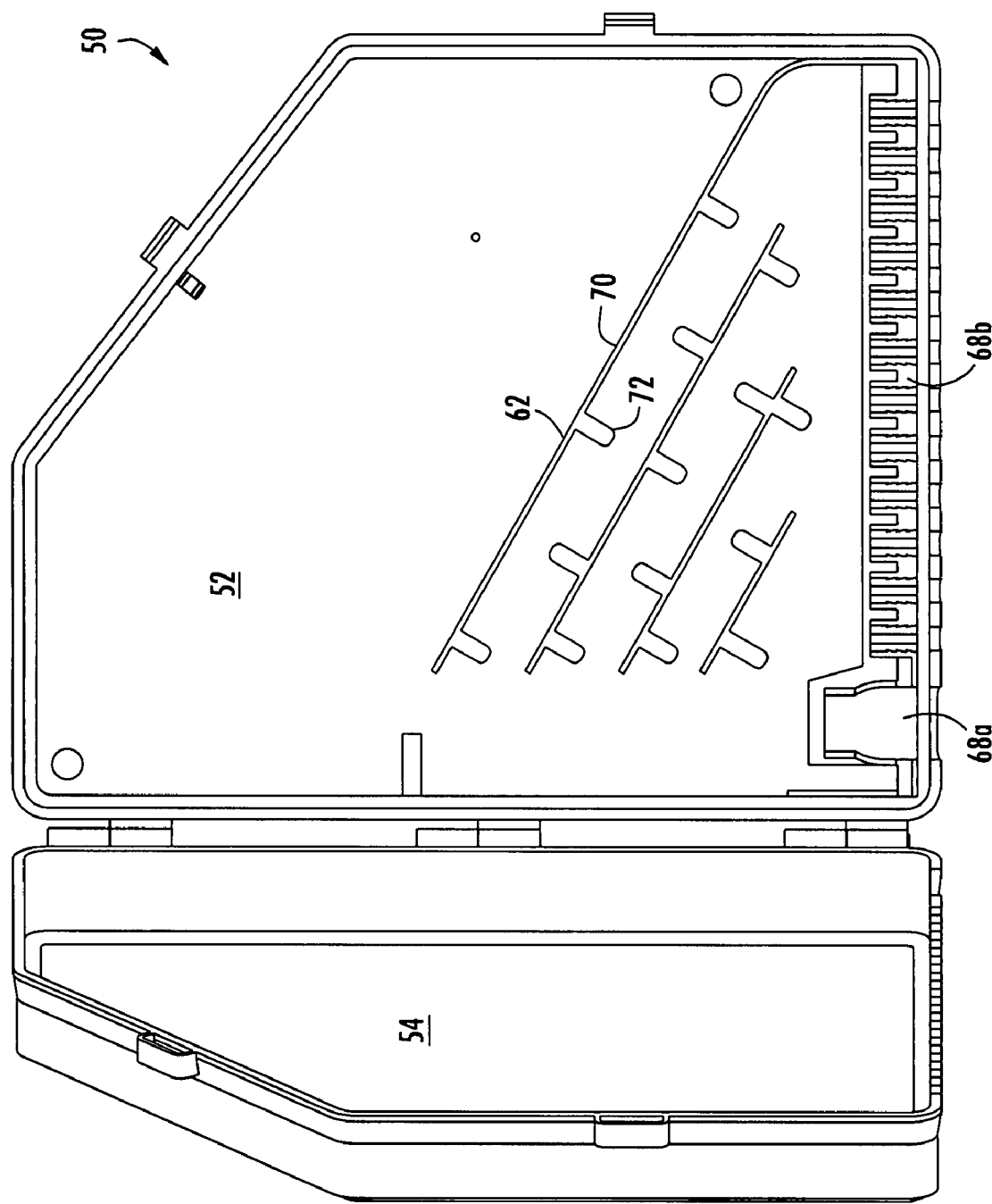
Figure 16:
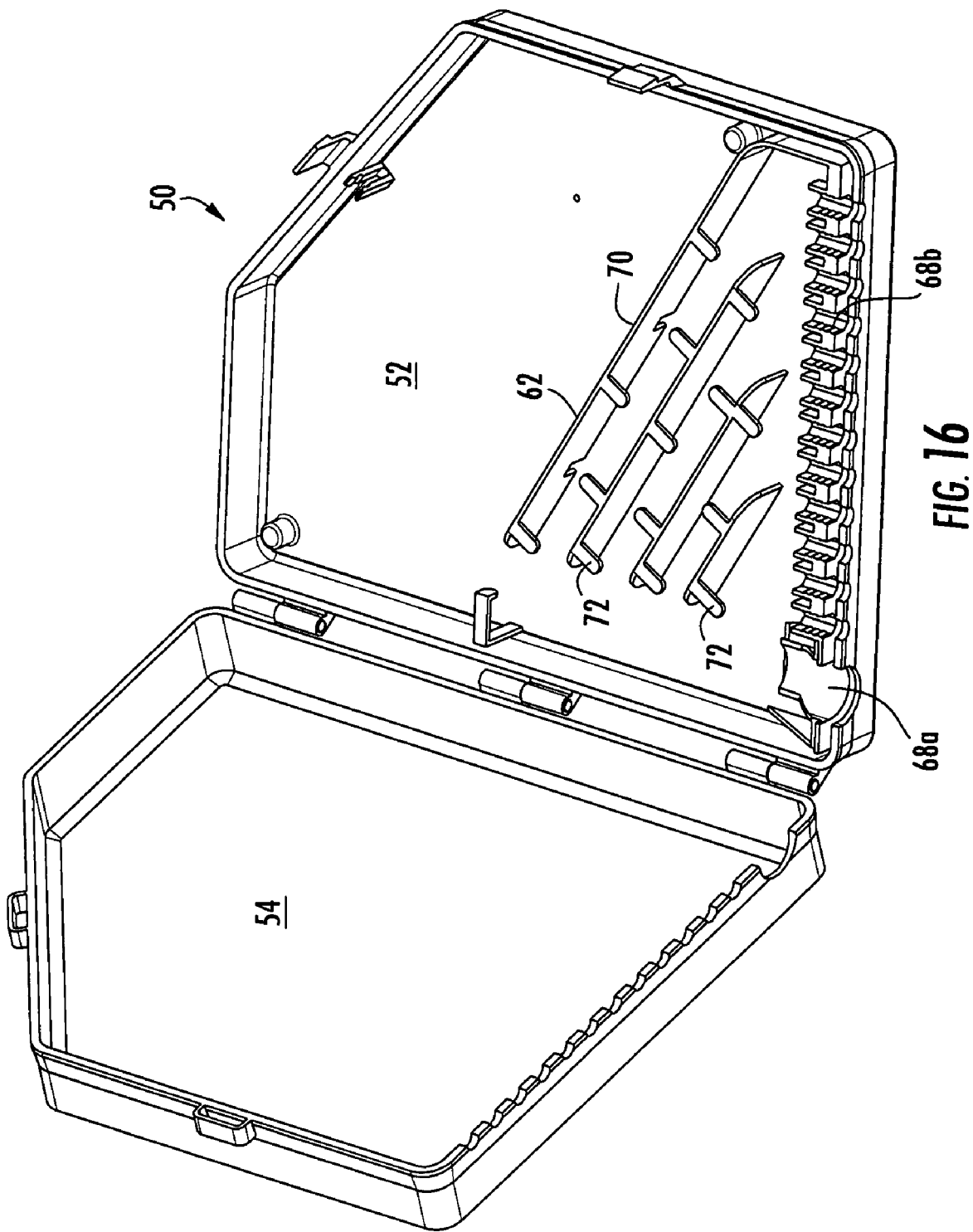

Having thus described the invention in general terms, reference will now be made to the accompanying drawings, which are not necessarily drawn to scale and are meant to be illustrative and not limiting, and wherein:

FIG. 1 is a perspective view of splice tray in accordance with one embodiment of the present invention, illustrating an optical fiber routing device provided on an outside surface of the cover of the splice tray;

FIG. 2 is a perspective view of the splice tray similar to the embodiment of FIG. 1, illustrating the cover in a partially opened position, wherein the inside surface of the cover includes an optical fiber routing device;

FIG. 3 is a perspective view of the splice tray of FIG. 2, illustrating the cover in an opened position;

FIG. 4 is a perspective view of the splice tray of FIG. 2, illustrating the splice tray attached to a back wall of a fiber drop terminal ("FDT") in accordance with some embodiments of the present invention;

FIG. 5 is a perspective view of a splice assembly in accordance with another embodiment of the present invention, illustrating the removable splice tray within the splice assembly;

FIG. 6 is a front schematic view of the splice assembly of FIG. 5;

FIG. 7 is a bottom schematic view of the splice assembly of FIG. 5;

FIG. 8 is a perspective view of the splice assembly of FIG. 5;

FIG. 9 is another front schematic view of the splice assembly of FIG. 5;

FIG. 10 is another bottom schematic view of the splice assembly of FIG. 5;

FIG. 11 is a perspective view of the splice tray of the splice assembly of FIG. 5;

FIG. 12 is a front schematic view of the splice tray of the splice assembly of FIG. 5;

FIG. 13 is a side schematic view of the splice tray of the splice assembly of FIG. 5;

FIG. 14 is a detailed front schematic view of the splice tray of the splice assembly of FIG. 5, showing the fiber routing of the spliced optical fibers;

FIG. 15 is a front schematic view of the base and cover of the splice assembly of FIG. 5; and FIG. 16 is a perspective view of the base and cover of the splice assembly of FIG. 5.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing splices of microstructured optical fibers are described and shown in the accompanying drawings with regard to specific types of splice trays and splice assemblies, it is envisioned that the functionality of the various apparatus and methods may be applied to any now known or hereafter devised splice trays and splice assemblies in which it is desired to provide splices of optical fibers. Like numbers refer to like elements throughout.

With reference to FIGS. 1-16, a splice tray and a splice assembly in accordance with certain embodiments of the present invention are illustrated. As described more fully below, these splice trays and assemblies are described as including microstructured optical fibers; however, further embodiments of the present invention include splice trays and assemblies adapted for use with alternative optical fibers. In addition, whereas the illustrated embodiment includes splice trays and assemblies intended for use with fiber drop terminals ("FDTs"), further embodiments of the present include splice trays adapted for use in alternative network access points and for other portions of the fiber optic network to optically connect any fibers within the fiber optic network. Furthermore, although no dimensions are provided in this patent application, splice trays of certain embodiments of the present invention include many of the dimensional characteristics, functional, design, and other features of the splice trays disclosed in U.S. patent application Ser. No. 11/595,723 filed on Nov. 9, 2006, which is assigned to the present assignee and the disclosure of which is incorporated in its entirety by reference herein.

Turning now to the embodiment of FIGS. 1-4, a splice tray 10 for accommodating at least one splice of two or more optical fibers 12 and 14 is provided. The splice tray 10 comprises a base 16 and a cover 18 rotatably attached to the base to selectively define an opened position (FIG. 3) and a closed position (FIG. 1). The splice tray 10 includes a plurality of splice holders 20, such as the twelve splice holders of the illustrated embodiment, joined to the base 16 of the splice tray. The splice tray 10 includes a splice organizer 22 which defines the splice holders 20, and the splice organizer in some embodiments of the present invention is rotatably mounted to the base of the splice tray. The splice holders 20 are adapted to selectively receive a splice 24 that optically connects a first optical fiber 12 and a second optical fiber 14. Whereas the illustrated splice tray 10 includes splice holders 20 adapted to hold a single splice of two single fibers, splice trays of further embodiments of the present invention include splice holders adapted to hold splices of ribbon fibers (multiple fibers) and/or to hold multiple splices of single fibers in a generally vertical or other orientation.

The splice tray 10 further includes at least one optical fiber routing device 26 provided on the inside surface (surface generally facing the base when the cover defines the closed position) of the cover 18 of the splice tray. The optical fiber routing device 26 includes inwardly extending tabs 28 extending from the sides of the cover 18 and/or from protrusions of the cover that may or may not be curved to direct the routed fiber. The inwardly extending tabs 28 allow optical fiber slack, which is desired to be provided to assist during the actual splice process (whether fusion splicing, mechanical splicing, or other), to be conveniently routed by the technician prior to splicing, to be securely retained when the splice tray is not being used by the technician, and to be conveniently accessed by a technician. Further embodiments of the present invention include alternative structures for the fiber routing device, that include, without limitations, curved surfaces, spools, standoffs, and other devices for routing fiber.

The splice tray 10 is adapted to provide slack storage for one or both of the optical fibers 12 and 14 when the cover 18 defines an opened position and when the cover defines a closed position. Although the cover 18 is illustrated as being rotated from the closed position to the opened position (or vice versa), further embodiments of the present invention include covers that are opened or closed by sliding the cover, lifting the cover, or otherwise moving the cover in a non-rotating fashion.

As shown in FIGS. 1-3, additional fiber routing devices 26 are provided on the base 18 and on the outside surface 30 of the cover 16 to provide additional slack storage for the optical fibers 12 and 14. However, further embodiments of the present invention include few and/or alternative fiber routing devices to provide slack storage. The splice tray 10 of the illustrated embodiment also defines longitudinal sides 32 and transverse sides 34 that are generally orthogonal to the longitudinal sides. The splice holders 20 define axes that are generally aligned with the longitudinal sides 32. The cover 18 is rotatably attached to a transverse side 34 of the base 16 with a hinge portion 36. The hinge portion 36 is rotatably attached to the base 16 and the cover 18 is rotatably attached to the hinge portion, such that the opened position of the cover comprises the base and the cover in a generally parallel relationship, as illustrated in FIG. 3. Still further embodiments of the present invention comprise alternative devices for opening and closing the splice tray.

The present invention also provides methods for splicing two or more optical fibers. A splice tray comprising a base and a cover is provided and the cover is opened relative to the base. A first optical fiber is spliced to a second optical fiber to define a splice that is positioned within a splice holder joined to the base of the splice tray. Slack of the first optical fiber and/or the second optical fiber is routed along at least one optical fiber routing device provided on the cover of the splice tray. The cover is then closed to securely store the optical fiber slack.

As shown in FIG. 4, the splice tray of FIGS. 1-3 may be inserted into a fiber drop terminal ("FDT") 40 of the type described in the concurrently filed U.S. patent application entitled "Fiber Optic Drop Terminals for Multiple Dwelling Units" that is assigned to the present assignee and the disclosure of which is incorporated by reference in its entirety herein. Still further embodiments of the present invention include splice trays adapted for use in additional and/or alternative fiber optic enclosures for use at any location with a fiber optic network.

Turning now to the splice assembly 50 of FIGS. 5-16, the splice assembly is adapted to be used as an FDT for fiber optic networks that do not include connectorized distribution cables and/or drop cables. The splice assembly 50 is adapted for use within a multiple dwelling unit ("MDU") to optically connect one or more optical fibers of a distribution cable to one or more optical fibers of drop cables. The splice assembly comprises a base 52 and a cover 54 rotatably attached to the base to selectively define an opened position and a closed position. A splice tray 56 comprising a plurality of splice holders 58 is joined to the splice tray. As described above, the splice holders 58 are adapted to selectively receive a splice that optically connects an optical fiber of the distribution cable to an optical fiber of the drop cable. The splice tray 56 is attached to the base 52 of the splice assembly 50, and includes an optical fiber routing device 60 associated with the splice tray. The base 52 of the splice assembly 50 includes at least one cable routing device 62. The splice assembly 50 of FIGS. 5-16 is adapted for use with microstructured optical fibers, which are described more fully below.

Referring now to the splice tray 56 shown in FIGS. 11-14, the splice tray includes a plurality of openings 64 that selectively receive strain relief devices (not shown) for the spliced optical fibers. The strain relief devices include wire ties for wrapping around a cable or fiber and plugs for connecting the wire ties to the openings 64. Further embodiments of the present invention include alternative strain relief devices. As also shown in FIGS. 11-14, the splice tray 56 includes a number of retention features 66 to provide for secure retention of the splice tray within the splice assembly, while allowing convenient removal from and/or insertion into the splice assembly 50.

The base 52 of the splice assembly includes a plurality of openings 68a and 68b along a bottom surface of the base for passage of the distribution cable(s) (opening 68a) and drop cables (openings 68b). The openings 68b, as shown in FIGS. 15 and 16 include barb-type entry ports to assist in the retention of the drop cables inserted into splice assembly. The base 52 further includes a cable routing device 62 that comprises a plurality of parallel dividers 70 with tabs 72 extending generally orthogonally from the dividers, such that the drop cables may be conveniently routed through, and securely retained by, the cable routing device. Finally, as shown in FIGS. 5-9, the splice assembly 50 includes a base 52 and cover 54 that define a polygonal perimeter comprising at least five sidewalls. Still further embodiments of the present invention include additional and/or alternative shapes, design, and features to provide convenient splicing and slack storage of optical fibers.

Various embodiments of the present invention are adapted to include bend performance optical fibers. One example of bend performance optical fiber is a microstructured optical fiber having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

In some embodiments of the present invention, the microstructured optical fibers disclosed herein comprises a core region disposed about a longitudinal centerline and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", it is meant that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. In some embodiments, the core region comprises a single core segment having a positive maximum refractive index relative to pure silica $\Delta_1$ in %, and the single core segment extends from the centerline to a radius R1. In one set of embodiments, $0.30\% < \Delta_1 < 0.40\%$, and 3.0 μm<R1<5.0 μm. In some embodiments, the single core segment has a refractive index profile with an alpha shape, where alpha is 6 or more, and in some embodiments alpha is 8 or more. In some embodiments, the inner annular hole-free region extends from the core region to a radius R2, wherein the inner annular hole-free region has a radial width W12, equal to R2−R1, and W12 is greater than 1 μm. Radius R2 is preferably greater than 5 μm, more preferably greater than 6 μm. The intermediate annular hole-containing region extends radially outward from R2 to radius R3 and has a radial width W23, equal to R3−R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region and the cladding region are preferably comprised of silica. The core region is preferably silica doped with one or more dopants. Preferably, the core region is hole-free. The hole-containing region has an inner radius R2 which is not more than 20 μm. In some embodiments, R2 is not less than 10 μm and not greater than 20 μm. In other embodiments, R2 is not less than 10 μm and not greater than 18 μm. In other embodiments, R2 is not less than 10 μm and not greater than 14 μm. Again, while not being limited to any particular width, the hole-containing region has a radial width W23 which is not less than 0.5 μm. In some embodiments, W23 is not less than 0.5 μm and not greater than 20 μm. In other embodiments, W23 is not less than 2 μm and not greater than 12 μm. In other embodiments, W23 is not less than 2 μm and not greater than 10 μm.

Such fiber can be made to exhibit a fiber cutoff of less than 1400 nm, more preferably less than 1310 nm, a 20 mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and a 8 mm macrobend induced loss at 1550 nm of less than 5 dB/turn, preferably less than 1 dB/turn, more preferably less than 0.5 dB/turn, and even more preferably less than 0.2 dB-turn, and still even more preferably less than 0.1 dB/turn.

The fiber of some embodiments of the present invention comprises a core region that is surrounded by a cladding region that comprises randomly disposed voids which are contained within an annular region spaced from the core and positioned to be effective to guide light along the core region. Other optical fibers and microstructured fibers may be used in the present invention. Additional features of the microstructured optical fibers of additional embodiments of the present invention are described more fully in pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; and 60/841,490 filed Aug. 31, 2006; all of which are assigned to Corning Incorporated and the disclosures of which are incorporated by reference herein.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

That which is claimed:

1. A splice tray for accommodating at least one splice of two or more optical fibers, the splice tray comprising:
    a base, wherein the base defines transverse sides;
    a cover to selectively define an opened position and a closed position;
    a hinge portion, the hinge portion having a first hinge that attaches the base at one of the transverse sides to the hinge portion on a first axis and a second hinge that attaches the cover to the hinge portion on a second axis;
    at least one splice holder joined to the base of the splice tray, wherein the at least one splice holder is adapted to selectively receive a splice that optically connects a first optical fiber and a second optical fiber; and
    at least one optical fiber routing device provided on the cover of the splice tray;
    wherein the optical fiber routing device is adapted to provide slack storage for at least one of the first optical fiber and the second optical fiber when the cover defines an opened position and when the cover defines a closed position.

2. A splice tray according to claim 1 further comprising a splice organizer, wherein the at least one splice holder is defined in the splice organizer.

3. A splice tray according to claim 2, wherein the splice organizer is rotatably mounted to the base of the splice tray.

4. A splice tray according to claim 1, wherein at least one optical fiber routing device is provided on the base.

5. A splice tray according to claim 1, wherein the cover defines an inside surface that generally faces the base when the cover defines the closed position, and wherein the at least one optical fiber routing device is provided on the inside surface of the cover of the splice tray.

6. A splice tray according to claim 1, wherein the base defines longitudinal sides, and wherein the at least one splice holder defines an axis that is generally aligned with the longitudinal sides of the splice tray.

7. A splice tray according to claim 1, wherein the at least one splice holder is adapted to selectively receive two or more splices in a generally vertical fashion.

8. A splice tray according to claim 1 further comprising at least one optical fiber that comprises a microstructured optical fiber comprising a core region and a cladding region surrounding the core region, the cladding region comprising an annular hole-containing region comprised of non-periodically disposed holes.

9. A splice tray according to claim 8, wherein the microstructured fiber has an 8 mm macrobend induced loss at 1550 nm of less than 0.2 dB/turn.

10. A splice tray for accommodating at least one splice of two or more optical fibers, the splice tray comprising:
    a base, wherein the base defines transverse sides;

a hinge portion rotatably attached to the base at one of the transverse sides;

a cover rotatably attached to the hinge portion opposite the base to selectively define an opened position and a closed position of the splice tray such that the opened position comprises the base, the hinge portion, and the cover in a generally parallel relationship, wherein the cover defines an inside surface that generally faces the base when the cover defines the closed position;

at least one splice holder joined to the base of the splice tray, wherein the at least one splice holder is adapted to selectively receive a splice that optically connects a first optical fiber and a second optical fiber; and at least one optical fiber routing device provided on the inside surface of the cover of the splice tray;

wherein the optical fiber routing device is adapted to provide slack storage for at least one of the first optical fiber and the second optical fiber when the cover defines an opened position and when the cover defines a closed position.

11. A splice tray according to claim 10 further comprising a splice organizer, wherein the at least one splice holder is defined in the splice organizer.

12. A splice way according to claim 11, wherein the splice organizer is rotatably mounted to the base of the splice tray.

13. A splice tray according to claim 10 further comprising an additional optical fiber routing device provided on an outside surface of the cover of the splice tray.

14. A splice tray according to claim 11 further comprising at least one optical fiber that comprises a microstructured optical fiber comprising a core region and a cladding region surrounding the core region, the cladding region comprising an annular hole-containing region comprised of non-periodically disposed holes.

15. A splice tray according to claim 14, wherein the microstructured fiber has an 8 mm macrobend induced loss at 1550 nm of less than 0.2 dB/turn.

16. A method of splicing two or more optical fibers, the method comprising:

providing a splice tray comprising a base defining transverse sides, a hinge portion rotatably attached to the base at one of the transverse sides, and a cover rotatably attached to the hinge portion;

opening the cover relative to the base of the splice tray, wherein fully opening the splice tray defines the base, the hinge portion, and the cover in a generally parallel relationship;

splicing a first optical fiber to a second optical fiber to define a splice;

positioning the splice within a splice holder joined to the base of the splice tray;

routing at least one of the first optical fiber and the second optical fiber along at least one optical fiber routing device provided on the cover of the splice tray; and closing the cover of the splice tray.

17. A method according to claim 16, wherein splicing the first optical fiber to the second optical fiber comprises splicing a microstructured optical fiber comprising a core region and a cladding region surrounding the core region, the cladding region comprising an annular hole-containing region comprised of non-periodically disposed holes.

18. A method according to claim 16, wherein routing at least one of the first optical fiber and the second optical fiber comprises routing at least one of the first optical fiber and the second optical fiber along at least one optical fiber routing device provided on an inside surface of the cover of the splice tray.

19. A splice assembly adapted for use as a fiber drop terminal ("FDT") within a multiple dwelling unit to optically connect one or more optical fibers of a distribution cable to one or more optical fibers of drop cables, the splice assembly comprising:

a base, a cover rotatably attached to the base to selectively define an opened position and a closed position, wherein the base and the cover define a polygonal perimeter, and wherein both the base and the cover comprise at least five sidewalls;

a splice tray comprising a plurality of splice holders joined to the splice tray, wherein the splice holders are adapted to selectively receive a splice that optically connects an optical fiber of the distribution cable to an optical fiber of the drop cable, wherein the splice tray is attached to the base of the splice assembly; and at least one optical fiber routing device associated with the splice tray and at least one cable routing device associated with the base;

the splice tray further including a plurality of openings adapted for selectively receiving strain relief devices forte spliced optical fibers;

wherein at least one of the spliced fibers comprises a microstructured optical fiber comprising a core region and a cladding region surrounding the core region, the cladding region comprising an annular hole-containing region comprised of non-periodically disposed holes.

20. A splice assembly according to claim 19, wherein the splice tray is selectively removable from the base.

21. A splice assembly according to claim 19, the plurality of openings disposed along a bottom surface of the base, the openings each defining an axis, and wherein the splice tray is attached at an angle relative to the axes of the openings.

22. A splice assembly according to claim 19, the plurality of openings disposed along a bottom surface of the base, and wherein at least one of the openings defines a barb-type entry port.

23. A splice assembly according to claim 19, wherein the at least one cable routing device associated with the base comprises a plurality of parallel dividers with tabs extending generally orthogonally from the dividers.

24. A splice assembly according to claim 19, wherein the microstructured fiber has an 8 mm macrobend induced loss at 1550 nm of less than 0.2 dB/turn.

* * * * *